3,822,350
ANTIBIOTIC 21,190 RP AND PROCESS FOR PREPARING SAME

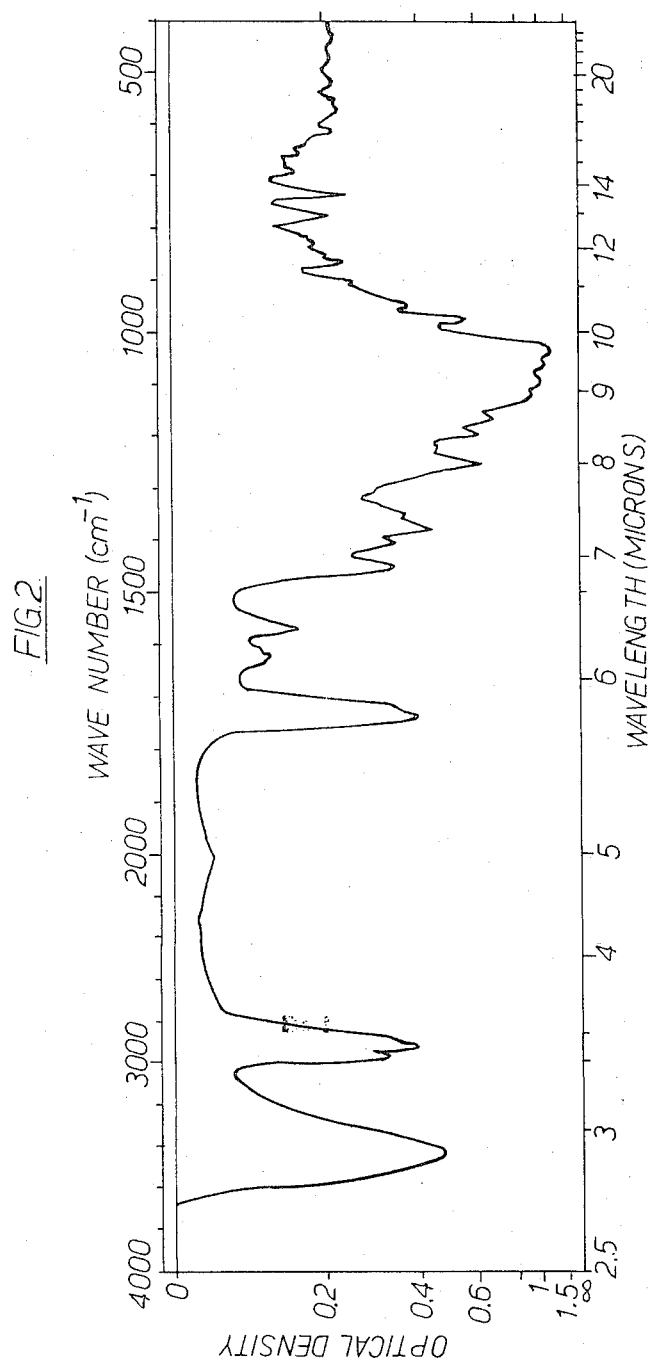

Denise Mancy, Charenton, and Jean Florent and Jean Preud'homme, Paris, France, assignors to Rhone-Poulenc S.A.
Filed Nov. 27, 1972, Ser. No. 309,810
Claims priority, application France, Nov. 29, 1971, 7142683
Int. Cl. A61k 21/00
U.S. Cl. 424—118       9 Claims

ABSTRACT OF THE DISCLOSURE

The new antibiotic 21,190 RP is prepared by cultivating the hitherto unknown microorganism *Streptomyces hygroscopicus DS 23,230* (NRRL 3576) under aerobic conditions in an aqueous nutrient medium. The antibiotic is active against Gram-positive and some Gram-negative microorganisms. It can be used as a growth promoting agent for animals.

---

Figure 1:
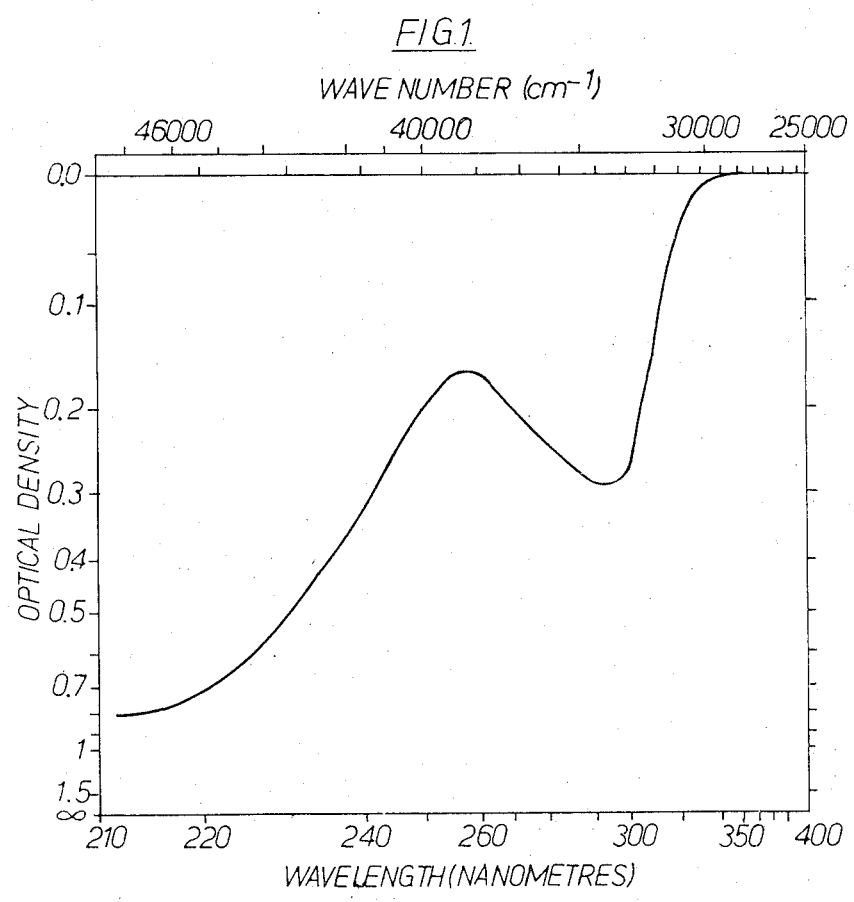

This invention relates to a new antibiotic, hereinafter denoted by the number 21,190 RP, to its preparation by culture of a Streptomyces strain identified more completely hereinafter and denoted by the name *Streptomyces hygroscopicus DS 23,230* and to compositions containing the antibiotic.

A specimen of *Streptomyces hygroscopicus DS 23,230* has been deposited at the U.S. Department of Agriculture, Northern Regional Research Laboratory, at Peoria, Ill., U.S.A., and has been given the number NRRL 3576; a sample of the microogranism can be obtained from the aforementioned Research Laboratory.

Antibiotic 21,190 RP is of value because of the antimicrobial activity which it exerts principally against Gram-positive microorganisms, in particular against staphylococci, as well as against certain Gram-negative microorganisms, especially against bacteria of the Neisseria genus, in conjunction with its low toxicity.

Antibiotic 21,190 RP is characterised by the following physico-chemical properties:

Appearance: white crystalline powder.

Elementary analysis: it contains carbon, hydrogen, oxygen and chlorine in the following proportions: C=50.5%; H=6.6%; O=38.4%; and Cl=4.5%

Solubility: it is soluble in water at pH 9 (10 g./l.) and in dimethylformamide (50 g./l.), sparingly soluble in methanol and ethanol and practically insoluble in hexane and benzene.

Melting point: (determination on a Kofler block) 226°–228° C.

Ultra-violet spectrum: when dissolved in aqueous 0.1 N sodium hydroxide solution, 21,190 RP shows an absorption maximum at 292 nm.

$$(E^{1\%}_{1cm.} = 59)$$

and an absorption minimum at 257 nm.

$$(E^{1\%}_{1cm.} = 33).$$

FIG. 1 of the accompanying drawings shows the U.V. spectrum of 21,190 RP dissolved in aqueous 0.1 N sodium hydroxide solution at a concentration of 50 μg./cc.

Infra-red spectrum: (determination from tablets of a mixture with KBr) this spectrum is shown in FIG. 2, in which the abscissae give the wavelength expressed in microns (lower scale) and the wave number in cm.$^{-1}$ (upper scale) and the ordinate gives the optical density.

The principal infra-red absorption bands of 21,190 RP, expressed in wave numbers (cm.$^{-1}$), are given in Table I.

TABLE I

| | |
|---|---|
| 3,440 S (partially due to H$_2$O) | 1,060 S |
| | 1,035 vS |
| 2,970 m | 975 m |
| 2,930 S | 942 m |
| 2,900 sh | 920 sh |
| 2,840 sh | 900 w |
| 1,735 S | 865 m |
| 1,715 m | 848 w |
| 1,630 m (H$_2$O) | 828 w |
| 1,570 m | 815 w |
| 1,450 S | 775 m |
| 1,403 m | 730 m |
| 1,380 S | 690 w |
| 1,350 m | 678 vw |
| 1,335 sh | 655 w |
| 1,305 sh | 630 sh |
| 1,248 S | 612 w |
| 1,220 w | 570 w |
| 1,192 m | 548 w |
| 1,165 m | 525 vw |
| 1,122 S | 510 vw |
| 1,090 S | | where vS=very strong; S=strong; m=medium; w=weak; vw=very weak; sh=shoulder.

Optical rotation:

$$[\alpha]^{20}_{D} = +3° \pm 3° \ (c.=0.5, \ 0.1 \ N \ NaOH)$$

$$[\alpha]^{20}_{436} = +7° \pm 3° \ (c.=0.5, \ 0.1 \ N \ NaOH)$$

$$[\alpha]^{20}_{365} = +20° \pm 3° \ (c.=0.5, \ 0.1 \ N \ NaOH).$$

Colour reactions: antibiotic 21,190 RP gives the following reactions: Positive with the following reagents: cysteine-carbazole, sulphuric acid, Wheeler-Tollens, Bial, Fehling (after acid or alkaline hydrolysis) and Molisch. Negative with Millon, Nessler, Ehrlich, Zimmerman—Bitto, Sakaguchi, Elson-Morgan and Dische reagents.

Chromatographic migrations: The R$f$-values for 21,190 RP, deposited in an amount of 100 μg. on a plate of Kieselgel H (Merck) and revealed by bioautography with *Staphylococcus aureus* 209 P (ATCC 6538 P) as the sensitive microorganism, or by spraying with sulphuric acid and heating at 100° C., are given in Table II for some solvent systems.

TABLE II

| Solvents: | R$f$ |
|---|---|
| Chloroform | 0 |
| Benzene | 0 |
| Benzene-methanol 90-10 (v./v.) | 0.15 |
| Benzene-methanol 80-20 (v./v.) | 0.60 |
| Benzene-methanol 50-50 (v./v.) | 0.87 |
| Acetone | 0.80 |
| Methanol | 0.85 |

ANTIBIOTIC ACTIVITY AND TOXICITY (A) Bacteriostatic activity in vitro of 21,190 RP The bacteriostatic activity of 21,190 RP against a certain number of microorganisms was determined by one of the dilution methods usually employed for this purpose. For each microorganism the lowest concentration of substance which, under defined conditions, prevents any visible development in a suitable nutrient broth was determined. The results of the various determinations are given in Table III, wherein the minimum bacteriostatic concentrations are expressed in micrograms of substance per cc. of test medium.

TABLE III

| Microorganisms tested: | Minimum bacteriostatic concentrations (in μg./cc.) |
|---|---|
| Staphylococcus aureus, strain 209 P—ATCC 6538 P | 0.85 |
| Staphylococcus aureus, strain 133 (Institut Pasteur) | 1.1 |
| Staphylococcus aureus, Smith strain | 1.2 |
| Sarcina lutea—ATCC 9341 | 0.2 |
| Streptococcus faecalis—ATCC 9790 | 2 |
| Streptococcus viridans (Institut Pasteur) | 15 |
| Streptococcus pyogenes haemolyticus, Dig 7 strain (Institut Pasteur) | 0.25 |
| Diplococcus pneumoniae, Til strain (Institut Pasteur) | 0.1 |
| Neissseria catarrhalis (A 152, Institut Pasteur) | 1.25 |
| Neissseria meningitidis (5813, Institut Pasteur) | 0.6 |
| Neissseria gonorrhoeae (A 50, Institut Pasteur) | 1.25 |
| Bacillus subtilis—ATCC 6633 | 15 |
| Bacillus cereus—ATCC 6630 | 9 |
| Mycobacterium species—ATCC 607 | >150 |
| Escherichia coli—ATCC 9637 | >150 |
| Shigella dysenteriae, Shiga L (Institut Pasteur) | >150 |
| Salmonella paratyphi A (Lacasse strain, Institut Pasteur) | >150 |
| Salmonella schottmuelleri (paratyphi B) Fougenc strain (Institut Pasteur) | >150 |
| Proteus vulgaris | >150 |
| Klebsiella pneumoniae—ATCC 10.031 | >150 |
| Pseudomonas aeruginosa (Bass strain, Institut Pasteur) | >150 |
| Brucella bronchiseptica (CN 387—Wellcome Institute) | 35 |
| Pasteurella multocida (A 125, Institut Pasteur) | 0.2 |
| Mycoplasma gallisepticum (A 514, Institut Pasteur) | 3 |

21,190 RP also possesses a marked bactericidal activity, *in vitro*, against staphylococcus; the ratio between the bacteriostatic and bactericidal concentrations is of the same order as that of penicillin G.

(B) Toxicity

The toxicity of 21,190 RP is low as is shown by the results obtained by subcutaneous administration to mice:

$LD_{50}=2,500$ mg./kg. animal body weight administered subcutaneously.

$LD_0=1,000$ mg./kg. animal body weight administered subcutaneously.

(C) Antimicrobial activity *in vivo*

Antibiotic 21,190 RP is active, in mice, against experimentally-induced infections caused by staphylococci, steptococci and meningococci, when it is administered subcutaneously, but is inactive when administered orally. When the product is administered subcutaneously for two consecutive days to mice, the 50% curative doses ($CD_{50}$) are between 2 and 18 mg./kg. animal body weight, administered subcutaneously, depending on the bacterium used.

The organism which produces antibiotic 21,190 RP is a strain of microorganism which has been isolated from a sample of earth taken in Great Britain, in Middlesex, and to which the number DS 23,230 (NRRL 3576) has been given.

The isolation of this microorganism was carried out by following the general method which consists of suspending a small amount of earth in sterile distilled water, diluting the suspension to different concentrations, and spreading a small volume of each dilution on the surface of Petri dishes containing a nutrient agar medium. After incubation for several days at 26° C., which makes it possible for the microorganisms to develop, the colonies which it is desired to isolate in order to continue the investigation of them are removed and transplanted to sloping nutrient agars for the purpose of producing more abundant cultures of them.

The strain of microorganism DS 23,230 belongs to the Streptomyces genus and, more precisely, is related to the species Streptomyces hygroscopicus, the essential characteristics of which have been defined by H. D. Tresner and E. J. Backus (Applied Microbiology, 4, 243–250, 1956) and by S. A. Waksman (The Actionomycetes, II, The Williams and Wilkins Company, Baltimore, 1961, pages 230–231). This is why it has been called Streptomyces hygroscopicus, DS 23,230.

S. hygroscopicus, DS 23,230 possesses, in effect, the following three properties which correspond to the three characteristics by which H. D. Tresner and E. J. Backus as well as S. A. Waksman define the species S. hygroscopicus: (a) its sporiferous filaments generally terminate in closed spirals with a coil of a few turns; these sporiferous filaments are usually inserted along a main filament, forming clusters which may be more or less elongated; (b) when its sporulated aerial mycelium has reached a good stage of development, it shows a dark grey colouration corresponding to that shown by the species S. hygroscopicus, and (c) on certain culture media which make good sporulation possible, after aging, shiny black regions with a wet appearance appear in the sporulated surfaces, characteristic of the species S. hygroscopicus; in the case of S. hygroscopicus, DS 23,230, the conversion of the dark green sporulated aerial mycelium into a black coating takes place only in quite an inconspicuous way, which is in general limited to small points or small regions distributed over the sporulated surface rather than taking place over this entire surface area. The appearance of these black regions is however evident and can be observed in particular on Hickey and Tresner agar, Pridham yeast extract agar, Pridham oatmeal and tomato, agar, glucose-asparagine agar, starch-nitrate agar and Pridham starch-inorganic salts agar.

H. D. Tresner and E. J. Backus describe the production of a wine-coloured soluble pigment, on certain media, varying according to the particular case, by certain strains of the species S. hygroscopicus. The strain DS 23,230 possesses this property to a very marked extent; it produces a reddish pink soluble pigment which may be more or less violet-coloured on quite a large number of media, and in such a way that in many cases it is capable of colouring the aerial mycelium which then assumes a pink shade before showing the characteristic grey colouration which it has when sporulation takes place.

On the few culture media where its morphological appearance is described, the strain S. hygroscopicus mentioned as reference by S. A. Waksman in "The Actinomycetes" shows a certain number of differences compared with the strain DS 23,230. The most noticeable are that it does not give any soluble pigment on gelatine, that it produces a light yellow soluble pigment on glucose-asparagine agar, and that it gives a well developed culture on nitrate agar containing sucrose, whilst the strain DS 23,230 gives a dark orange-brown soluble pigment on gelatine, as well as on asparagine-glucose agar and, due to the fact that it does not utilise sucrose, does not develop on Czapek synthetic nitrate agar containing sucrose. Furthermore, in no case is it stated that its non-sporulated aerial mycelium is coloured pink, as has just been stated in the case of the strain DS 23,230. However, these several differences are not sufficiently important, according to the ideas of H. D. Tresner and E. J. Backus, for it to be considered that the strain DS 23,230 can constitute a species which is different from the species S. hygroscopicus, since it presents the main characteristics of S. hygroscopicus which serve to define it.

*S. hygroscopicus*, DS 23,230 forms sporiferous filaments which generally terminate in closed spirals containing 1 to 5 turns, although very occasionally spirals forming a larger number of turns, or some sporiferous filaments which are simply curved over at their end part without forming a complete turn, or sometimes spirals which may be more or less loose and unwound, are observed. The sporiferous apparatus possesses a cluster structure, the spiral sporiferous filaments, which themselves can show some branches, being inserted along a main filament which can be quite long. The spores are oval and measure 0.6 to $0.8/1.0$ to $1.2\mu$. Microscopic examinations have shown an identical arrangement of the sporiferous apparatus on Hickey and Tresner agar and on Pridham starch-inorganic salts agar.

The culture characteristics and the biochemical properties of *S. hygroscopicus*, DS 23,230 are given in Table IV which follows. Unless otherwise stated, they are those of cultures which have reached a good stage of development, having been aged for about 3 to 4 weeks at 26° C. These properties have been observed on nutrient agars and broths usually employed to determine the morphological properties of strains of Streptomyces, the cultures on agar media being carried out on agar slopes. A certain number of culture media used were prepared in accordance with formulations indicated in "The Actinomycetes" (S. A. Waksman, pp. 193-197, Chronica Botanica Company, Waltham, Mass., U.S.A., 1950); in this case, they are indicated by the letter W followed by the number which was given them in "The Actinomycetes." The references or constitutions of the other culture media are as follows:

Ref. A—"Hickey and Tresner's Agar"—T. G. Pridham *et coll*—Antibiotics Annual, 1956–57, p. 950

Ref. B—Formulation W-23, to which 2% of agar has been added

Ref. C—K. L. Jones—Journal of Bacteriology, 57, 142, 1949

Ref. D—"Yeast Extract Agar"—T. G. Pridham *et coll*—Antibiotics Annual, 1956–57, p. 950

Ref. E—"Tomato Paste Oatmeal Agar"—T. G. Pridham *et coll*—Antibiotics Annual, 1956–57, p. 950

Ref. F—Peptone 0.5%—meat extract 0.3%—tyrosine 0.5%—agar 2%

Ref. G—"Melanin formation medium"—The Actinomycetes, vol. 2, p. 333—No. 42—S. A. Waksman—The Williams and Wilkins Company, Baltimore, 1961

Ref. H—W. E. Grundy *et coll*—Antibiotics and Chem., 2, 401, 1952

Ref. I—"Inorganic Salts—Starch Agar"—T. G. Pridham *et coll*—Antibiotics Annual, 1956–57, p. 951

Ref. J—Corresponds to the formulation W-1, wherein 30 g. of sucrose are replaced by 15 g. of glucose Ref. K—Corresponds to the formulation W-1, wherein 30 g. of sucrose are replaced by 15 g. of glycerine Ref. L—"Plain gelatin"—prepared according to the instructions in "Manual of Methods for Pure Culture Study of Bacteria" of the Society of American Bacteriologists—Geneva, N.Y., II$_{50}$–18

Ref. M—"Manual of Methods for Pure Culture Study of Bacteria" of the Society of American Bacteriologists—Geneva, N.Y., II$_{50}$–18

Ref. N—"Synthetic medium of Dimmick"—(not containing agar)—"Manual of Methods for Pure Culture Study of Bacteria" of the Society of American Bacteriologists, Geneva, N.Y., II$_{50}$–19

Ref. O—Corresponds to the formulation W-18, wherein 30 g. of sucrose are replaced by 15 g. of glucose Ref. P—Corresponds to the formulation W-18, wherein the sucrose is omitted and replaced by small strips of filter paper partially immersed in the liquid Ref. Q—Commercially available skimmed milk powder, reconstituted in accordance with the manufacturer's instructions Ref. R—Medium indicated for the research of the production of $H_2S$ by: H. D. Tresner and F. Danga—Journal of Bacteriology, 76, 239–244, 1958.

TABLE IV

| Culture media | Degree of development | Vegetative mycelium (V.m.) or underside of the culture | Aerial apparatus (comprising the combination of the aerial mycelium and the sporulation) | Soluble pigment | Observations and biochemical properties |
|---|---|---|---|---|---|
| Hickey and Tresner agar (Ref. A). | Good | Underside light orange-brown. | Pink to pink-grey and dark grey, with points having the black appearance characteristic of "Hygroscopicus". | Light orange-brown. | Sporiferous apparatus in clusters. Sporiferous filaments ending in closed spirals of 1 to 5 turns. Oval spores measuring 0.6 to 0.8/1.0 to $1.2\mu$. |
| Emerson agar (Ref. B). | Very good | Underside orange-brown. | Pink-white | Orange-brown | |
| Bennett agar (Ref. C) | do | Underside dark orange-brown. | Light pink-grey | do | |
| Pridham yeast extract agar (Ref. D). | do | do | Greyish-pink to light grey and dark grey, with points having the black appearance characteristic of "Hygroscopicus". | Very dark orange-brown. | |
| Pridham oatmeal and tomato agar (Ref. E). | do | Underside black-brown. | Greyish-pink to grey, with many points having the black appearance characteristic of "Hygroscopicus". | Very dark orange-brown, ranging towards blackish. | |
| Glucose-peptone agar (W-7). | Good | Underside violet-brown. | Light greyish-pink to light violet-grey. | Slightly violet-coloured brown. | |
| Nutrient agar (W-5) | Moderate | Underside yellow | Greyish-white. Poorly developed | None | |
| Nutrient agar containing tyrosine (Ref. F). | Quite good | Underside light brown-yellow. | Whitish | Light yellow-brown. | Solubilisation of tyrosine: positive. |
| Tyrosine-yeast extract agar ["Melanin formation medium" of Waksman] (Ref. G). | do | Underside yellowish-white. | Greyish-white | Very light brownish. | Production of melanin: negative (readings taken according to the author's recommendations). |
| Krainsky calcium malate agar (Ref. H). | Extremely poor. | V.m. colourless to whitish, in trace amounts. | None | None | Solubilisation of the malate: none or extremely low. |
| Ovalbumin agar (W-12) | Very moderate. | V.m. orange-brown. | do | Orange-brown | |
| Glucose-asparagine agar (W-2). | Quite good | Underside dark brown. | Light pink-grey to light grey and dark grey, with a few small points having the black appearance characteristic of "Hygroscopicus". | Very dark orange-brown. | |
| Glycerine-asparagine agar (W-3). | Good | Underside very dark brown. | Greyish-orange to light grey. Small droplets of yellow-brown exudation. | Blackish-brown. | |
| Starch-nitrate agar (W-10). | Very moderate. | Underside very dark violet. | Pink-white to violet-grey, with a few small points having the black appearance characteristic of "Hygroscopicus". | Light pink-violet. | Hydrolysis of the starch: positive. |

TABLE IV—Continued

| Culture media | Degree of development | Vegetative mycelium (V.m.) or underside of the culture | Aerial apparatus (comprising the combination of the aerial mycelium and the sporulation) | Soluble pigment | Observations and biochemical properties |
|---|---|---|---|---|---|
| Pridham starch-inorganic salts agar (Ref. I). | Very good | Underside dark yellow-brown. | Greyish-white to light grey and dark grey, with points having the black appearance characteristic of "Hygroscopicus". | Greyish-yellow-brown. | Sporiferous apparatus in clusters. Sporiferous filaments ending in closed spirals of 1 to 5 turns. Oval spores measuring 0.6 to 0.8/1.0 to 1.2μ. Hydrolysis of the starch: positive. |
| Czapek synthetic agar containing sucrose (W-1). | Practically none. | | | None | |
| Czapek synthetic agar containing glucose (Ref. J). | Good | Underside very dark reddish-violet. | Greyish-pink violet. Exudation of a few small pink droplets. | Very dark reddish-violet. | |
| Czapek synthetic agar containing glycerine (Ref. K). | Very good | Underside very dark red-brown. | Violet-pink. Exudation of small pink droplets. | Very dark reddish-violet-brown. | |
| Potato culture (W-27) | do | V.m. very well developed and very wrinkled; completely covered by the aerial mycelium. | Greyish-white tinged light pink in places. Numerous droplets of light brownish-yellow to orange-brown exudation. | Orange-brown to dark violet-reddish-brown. | |
| 12% pure gelatine (Ref. L). | Good | Well developed surface culture. Underside light orange-brown. | Whitish. Moderately developed. | Orange-brown | Liquefaction of the gelatine: quite rapid. |
| Nutrient nitrate broth (Ref. M). | Moderate | Thin, brownish-yellow ring. | Whitish. Very moderately developed. | None | Production of nitrites from nitrates: negative. |
| Starch nitrate broth (W-19). | Average | Whitish ring and velum. | do | Very weak brownish. | Production of nitrites from nitrates: positive. |
| Dimmick glucose nitrate broth (Ref. N). | Moderate | Small yellowish-brown colonies at the surface of the culture. | Whitish. In trace amounts. | do | Production of nitrites from nitrates: positive at the start of the culture, but quite quickly becomes negative. |
| Czapek synthetic broth containing glucose (Ref. O). | Moderate | Small whitish colonies clustered together at the surface of the culture. | Whitish. Very moderately developed. | None | |
| Czapek synthetic broth containing cellulose (Ref. P). | None | | | | Utilisation of the cellulose: negative |
| Skimmed milk (Ref. Q). | Poor | | | | Peptonisation without coagulation; pH unchanged in 1 month. |
| Tresner and Danga agar for investigation of the production of H₂S (Ref. R). | Quite good | V.m. light yellowish-brown. | None | Very light yellowish-brown. | Production of H₂S: negative (readings taken according to the author's recommendations). |

The capacity of *Streptomyces hygroscopicus, DS 23,230* for using various sources of carbon and nitrogen to achieve its development has been determined according to the principle of the Pridham and Gottlieb method (J. of Bact., 56, 107–114, 1948); the degree of development was observed, after a suitable incubation period at 26° C., on the base medium indicated by the authors, by replacing either the glucose by the various sources of carbon respectively tested, or $(NH_4)_2SO_4$ by the various sources of nitrogen respectively tested. The results are given in Table V.

TABLE V

| Sources of carbon tested | Utilisation | Sources of nitrogen tested | Utilisation |
|---|---|---|---|
| D-ribose | positive | NaNO³ | positive |
| D-xylose | positive | NaNO² | positive |
| L-arabinose | negative | (NH⁴)²SO⁴ | positive |
| L-rhamnose | negative | (NH⁴)²HPO⁴ | positive |
| D-glucose | positive | Adenine | positive |
| D-galactose | positive | Adenosine | positive |
| D-fructose | positive [1] | Uracil | negative |
| D-mannose | positive | Urea | positive |
| L-sorbose | negative | L-asparagine | positive |
| Lactose | positive | Glycine | positive |
| Maltose | positive | Sarcosine | negative |
| Sucrose | negative | DL-alanine | positive |
| Trehalose | positive | DL-valine | positive |
| Cellobiose | negative | DL-aspartic acid | positive |
| Raffinose | positive | L-glutamic acid | positive |
| Dextrin | positive | L-arginine | positive |
| Inulin | negative | L-lysine | positive |
| Starch | positive | DL-serine | positive |
| Glycogen | positive | DL-threonine | positive |
| Glycerol | positive | DL-methionine | negative |
| Erythritol | negative | Taurine | negative |
| Adonitol | negative | L-tyrosine | positive |
| Dulcitol | negative | DL-proline | positive |
| D-mannitol | positive | L-hydroxyproline | positive |
| D-sorbitol | negative | L-histidine | positive |
| Inositol | positive | | |
| Salicine | negative | | |

[1] But weak.

According to a feature of the invention the antibiotic 21,190 RP is produced by aerobically cultivating *Streptomyces hygroscopicus DS 23,230* (NRRL 3576), or a mutant thereof capable of producing the antibiotic, using an aqueous nutrient medium containing assimilable sources of carbon, nitrogen and inorganic substances, and isolating from the medium 21,190 RP formed during the culture.

The culture of *Streptomyces hygroscopicus DS 23,230* can be carried out by any of the known aerobic surface culture or submerged culture methods, but the latter are preferred for reasons of convenience. For this purpose, the various types of apparatus which are currently employed in the fermentation industry may be used. In particular, the following sequence of operations can be adopted:

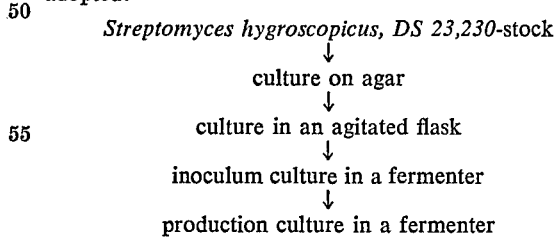

Streptomyces hygroscopicus, DS 23,230-stock
↓
culture on agar
↓
culture in an agitated flask
↓
inoculum culture in a fermenter
↓
production culture in a fermenter The fermentation medium must contain an assimilable source of carbon and an assimilable source of nitrogen, inorganic substances, particularly chlorides, and optionally growth-promoting factors; all these ingredients may be supplied as well-defined products or complex mixtures such as those found in biological products of various origins.

As sources of assimilable carbon, there may be used carbohydrates such as glucose, maltose, dextrins, starch, or other carbon-, hydrogen- and oxygen-containing substances such as sugar alcohols, e.g. glycerol or mannitol, or certain organic acids, e.g. lactic acid or citric acid. Certain animal or vegetable oils such as lard oil or soya bean oil may be advantageously used instead of, or in admixture with, the aforementioned carbon-, hydrogen- and oxygen-containing substances.

The suitable sources of assimilable nitrogen are extremely varied. They can be very simple chemical compounds such as inorganic or organic ammonium salts, urea or certain amino acids. They can also be complex substances containing principally nitrogen in a protein form, such as casein, lactalbumin, gluten and their hydrolysates, soya bean flour, peanut meal, fish meal, meat extract, yeast extract, distillers' solubles or corn-steep liquor.

Amongst the inorganic substances, some may have a buffering or neutralizing effect such as the alkali metal or alkaline earth metal phosphates or the carbonates of calcium or magnesium. Others contribute to the ionic equilibrium necessary for the development of *Streptomyces hygroscopicus, DS 23,230* and for the production of 21,190 RP, such as the chlorides and sulphates of the alkali metals and alkaline earth metals. Some of them act more especially as activators of the metabolism of *Streptomyces hygroscopicus, DS 23,230*, e.g. the salts of zinc, cobalt, iron, copper and manganese.

The pH of the fermentation medium at the start of the culture should be between 6.0 and 7.8 and preferably between 6.5 and 7.5. The optimum fermentation temperature is 25°–30° C., but satisfactory production is achieved at temperatures between 23° and 33° C. The rate of aeration of the fermentation broth can vary within quite wide limits, but it has been found that aeration rates of 0.3 to 3 litres of air per litre of broth per minute are particularly suitable. The maximum yield of antibiotic 21,190 RP is obtained after 2 to 8 days' culture, but this period depends predominantly on the medium used.

It can be seen from the foregoing that the general conditions for the culture of *Streptomyces hygroscopicus, DS 23,230* for the production of 21,190 RP can vary to quite a large extent and can be adapted for each particular requirement.

21,190 RP can be isolated from the fermentation broth in the following manner:

The antibiotic is extracted from the filtrate of the fermentation broth by water-immiscible solvents, such as aliphatic alcohols having at least 4 carbon atoms (e.g. butanol), chlorinated hydrocarbons (e.g. methylene chloride), esters (e.g. ethyl acetate) and ketones (e.g. methyl isobutyl ketone). This operation can be carried out at a pH between 3 and 9, and preferably at about pH 7.

After decantation, the crude antibiotic can be isolated from its solution in the above-mentioned organic solvents by concentration of these solutions under reduced pressure, followed by precipitation by a non-solvent or a poor solvent, for the antibiotic, such as hexane, or by allowing to stand in a cold chamber.

The crude 21,190 RP can be purified by conventional methods such as recrystallisation, chromatography on various adsorbing agents or counter-current distribution.

It is advantageous to purify 21,190 RP by recrystallisation from ethanol after treatment with activated charcoal, followed by recrystallisation from a mixture of dimethylformamide and water.

The following Example illustrates the invention.

In the following, the activity is always determined by means of the microbiological diffusion method, using *Staphylococcus aureus* 209 P (ATCC 6538 P) as the sensitive microorganism, by comparison with a sample of pure 21,190 RP taken as the standard and containing 1,000 µg./mg. This activity is expressed in µg./cc. for solutions and in µg./mg. for solid products.

EXAMPLE 1

A 170-litre fermenter is charged with:

| | G. |
|---|---|
| Peptone (Cl⁻=3.5%) | 1,200 |
| Meat extract (Cl⁻=1%) | 600 |
| Cerelose | 1,200 |
| Agar | 240 |

Tap water, sufficient to make up to 110 litres.

The pH is adjusted to 7.20 with 10 N sodium hydroxide solution (120 cc.). The medium is sterilised by bubbling steam at 122° C. through it for 40 minutes. After cooling, the volume of the broth is 120 litres and the pH is 6.60. The broth is inoculated with a culture (200 cc.) of *Streptomyces hygroscopicus, DS 23,230* in a shaken Erlenmeyer flask. The culture is developed at 26° C. for 29 hours with agitation and aeration with sterile air; it is then suitable for inoculating the production culture.

The production culture is carried out in a 800-litre fermenter, charged with the following substances:

| | | |
|---|---|---|
| Soya bean flour | kg | 6 |
| Distillers' solubles | kg | 10 |
| Calcium carbonate | kg | 2 |
| Cobalt chloride·6H$_2$O | g | 8 |

Tap water, sufficient to make up to 325 litres.

The pH is adjusted to 7.80 with 10 N sodium hydroxide solution (1,200 cc.), and the medium is sterilised by bubbling steam at 122° C. for 40 minutes. After cooling, the volume of the broth is 355 litres. It is made up to 400 litres by adding an aqueous sterile solution (40 litres) containing hydrated glucose (8 kg.) and an aqueous sterile solution (5 litres) containing ammonium sulphate (800 g.) The pH is then 6.80.

The broth is then inoculated with the inoculum culture (40 litres) from the 170-litre fermenter described above. The culture is carried out at 26° C. for 64 hours with agitation using a motor rotating at 205 revolutions per minute and aeration with sterile air (20 m.³/hour).

After 24 and 48 hours of culture, an aqueous sterile solution (5 litres) is added, containing hydrated glucose (2 kg.).

At the end of the operation, the pH of the culture is 7.50 and the volume of the broth is 410 litres. The amount of 21,190 RP present is 240 µg./cc.

The broth is introduced into a tank equipped with a stirrer, and a filtration aid (Clarcel DIC) (30 kg.) is then added. The suspension is filtered on a filter press and the filter cake is washed with water (100 litres). The filtrate, the volume of which is 430 litres, is extracted in two stages with butanol (240 litres), using a group of centrifuges in countercurrent. The flow rate of the filtrate is adjusted to 180 litres/hour and the flow rate of the solvent to 100 litres/hour. The extract, the volume of which is 250 litres, contains the major portion of the activity. It is washed with water (25 litres). The washed extract has a volume of 225 litres. It is concentrated at 35° C. under reduced pressure (20 mm. Hg) to a volume of 2 litres.

The concentrate is left to stand in a cold chamber at +5° C. After 12 hours at this temperature the precipitate which has formed is filtered off, washed with butanol (500 cc.) and dried. Antibiotic 21,190 RP (230 g.), the strength of which is 260 µg./mg., is thus obtained.

Crude 21,190 RP (137 g.), prepared under the above conditions, but of strength 216 µg./mg., is suspended in ethanol (3.5 litres). The suspension is heated under reflux for 30 minutes and then filtered whilst hot. The insoluble material is discarded. The filtrate, to which decolourising charcoal (Darco G 60) (10 g.) has been added, is stirred whilst heating under reflux for 15 minutes and then filtered using a filtration aid (10 g.).

The solution obtained is concentrated under reduced pressure to a volume of 1 litre. The concentrate is placed in a cold chamber at +5° C. for 12 hours. After this period, the crystals which have formed are filtered off, washed with ethanol (50 cc.) and dried. Crystalline 21,190 RP (26.2 g.) of which the strength is 920 µg./mg., is thus obtained.

The antibiotic (85.5 g.), prepared under the above conditions, is dissolved in dimethylformamide (4.25 litres). The solution is clarified by filtration and then introduced into a flask equipped with a stirrer. Water (3 litres) is run slowly into the clarified solution, whilst continuing the stirring. After the end of the addition, the suspension of crystals is cooled to +10° C. The crystals are then filtered off, washed with a dimethylformamide/water (1:1 v./v.) mixture (1 litre) and then re-suspended in water (1.5 lires). They are finally filtered off and dried for 24 hours at 40° C. under reduced pressure (1 mm. Hg). Crystalline 21,190 RP (61.5 g.), of strength 1,000 μg./mg., melting at 226–228° C., is thus obtained.

Since antibiotic 21,190 RP is particularly active against streptococci and staphylococci, it can advantageously be used in the local treatment of mastitis, metritis and cutaneous infections of domestic animals. At a dose of 1 mg./kg. animal body weight (intramuscular) the antibiotic showed good activity in chickens infected with *Borrelia anserina* (responsible for avian spirochaetes).

The present invention includes within its scope therapeutic compositions for veterinary use comprising 21,190 RP in association with a physiologically acceptable carrier and/or a compound which may itself be physiologically active, for example an antimicrobial agent such as an antibiotic with a different antibacterial spectrum, or an antifungal agent.

For therapeutic application, antibiotic 21,190 RP can be made up in any of the usual various forms suitable for the method of administration envisaged, such as liquid formulations (suspensions, or dispersions, preferably prepared at the time of use from a solid composition), paste formulations (creams and ointments) and solid formulations (vaginal tablets, ovules and powders). The proportion of 21,190 RP may be varied according to the method of treatment and of the type of formulation. Thus a formulation prepared immediately before use for intramuscular injection can comprise a unit dose of 21,190 RP and a dose of liquid suitable for veterinary use, for example an isotonic saline solution buffered to pH 7.2 with phosphates, to give a suspension containing 1% by weight of antibiotic. A powder for dusting can contain 5 to 50% by weight of 21,190 RP, a powder which can be dispersed in a liquid suitable for intramammary injection can contain up to 99% by weight of antibiotic in association with a physiologically acceptable dyestuff such as Blue F.C.F. (Alphazurine FG—Food Blue No. 2—C.I. No. 42,090) and with a physiologically acceptable dispersing agent, and an ointment can contain 0.5 to 10% by weight of antibiotic, the excipients being chosen from amongst those which are usually employed in these types of formulations.

When added to animal feedstuffs antibiotic 21,190 RP makes it possible to achieve an increase in the weight of the animal which is more rapid than with feedstuffs devoid of it.

Another aspect of the present invention therefore comprises animal feedstuffs, or concentrated mixtures for animal feeding, containing the antibiotic 21,190 RP.

The dose necessary to produce a suitable growth-promoting effect can naturally vary within quite wide limits depending on the species of animals and on the nutritional value of the feedstuffs themselves. In general terms, it is sufficient for the feed rations made available to the animals to contain 1 to 50 g. of antibiotic 21,190 RP per metric ton of feedstuff (and up to 80 g. per metric ton for weaner feedstuffs).

The antibiotic 21,190 RP can be contained as a uniform dispersion in complete composite feedstuffs, at the above doses.

It can be distributed in supplementary feedstuffs to an extent of 0.1 to 0.0001% by weight thereof, most frequently with other additives such as vitamins and inorganic salts. These supplementary feedstuffs can either be mixed with the animal's rations or consumed directly, and usually represent about 5 to 20% of the ration.

The "premixes," which are used for preparing complete rations or supplementary feedstuffs, usually contain 0.05 to 20% by weight of antibiotic 21,190 RP diluted with a physiologically innocuous carrier, for example, an amount of food. They constitute a convenient intermediate which makes it easier to distribute the antibiotic 21,190 RP evenly in feedstuffs. The premixes themselves are generally produced from concentrates which contain 99.9 to 20% by weight of antibiotic 21,190 RP, to which a physiologically innocuous carrier or edible denaturants such as feed dyestuffs, flavouring agents, dispersing agents or agents which prevent agglomeration, and fillers, have been added. A concentrate can contain, for example, by weight, 99% of antibiotic 21,190 RP with 0.1% of dyestuff and 0.9% of antiagglomerating agent.

The concentrates and premixes are generally powders. The supplementary feedstuffs and the complete composite feedstuffs can be either powders or in the form of granules, prepared according to the usual techniques. In these different compositions, antibiotic 21,190 RP can be in the form of fine free particles or covered with a coating.

The antibiotic 21,190 RP is suitable for administration to all animals and especially to fowls.

The following Examples illustrate this aspect of the invention.

EXAMPLE 2

Chicks (SELAF 915) are distributed in batteries at the rate of 14 per coop, each coop containing chicks of the same sex. As many young hens as young cocks are used. The chicks are placed in warm batteries from the age of 1 day and during the 4 weeks of the experiment. The feedstuffs to be tested are dispensed from day 2.

The chicks are weighed and the amount of feedstuff consumed is determined after 2 and 4 weeks. The gain in weight and the consumption index is calculated after 2 weeks and after 4 weeks.

The chicks receive a basic feedstuff having the following composition:

|  | Percent |
|---|---|
| Flour of cereal by-products | 13.41 |
| Barley flour | 13.41 |
| Maize flour | 13.41 |
| Wheat flour | 31.32 |
| Fish meal | 8.92 |
| Soya bean flour | 8.92 |
| Dehydrated hay flour | 4.56 |
| Yeast solids (whole cells or autolysate) | 2.33 |
| Dried milk powder | 2.68 |
| Sodium chloride | 0.09 |
| Calcium carbonate | 0.89 |
| Mineral elements (Mn, I, and Zn) | 0.06 |

This feedstuff contains in addition:

| | |
|---|---|
| Vitamin A | IU/kg. 4,000 |
| Vitamin $D_3$ | IU/kg. 1,000 |
| Choline chloride | mg./kg. 11.5 |
| Riboflaven | mg./kg. 2.24 |

The chicks are divided into 2 groups (4 coops per group, each group containing 28 young hens and 28 young cocks). Group I receives the control feedstuff. Group II receives the control feedstuff to which the antibiotic 21,190 RP has been added at a concentration of 10 g. per metric ton of feedstuff.

The results obtained are as follows:

I.—Average weight (in grams)

|  | On day 1 ||| At 2 weeks ||| At 4 weeks |||
|---|---|---|---|---|---|---|---|---|---|
|  | Young cocks | Young hens | Young cocks and young hens | Young cocks | Young hens | Young cocks and young hens | Young cocks | Young hens | Young cocks and young hens |
| Group I | 38 | 37 | 37 | 189 | 181 | 185 | 510 | 452 | 479 |
| Group II | 37 | 37 | 37 | 202 | 193 | 197 | 559 | 494 | 527 |

II.—GAINS IN WEIGHT AND CONSUMPTION INDICES

|  | Group I (control) | | | Group II | | |
|---|---|---|---|---|---|---|
|  | Young cocks | Young hens | Young cocks and young hens | Young cocks | Young hens | Young cocks and young hens |
| 1 day to 2 weeks: | | | | | | |
| Gain in weight (in g.) | 151 | 144 | 148 | 165 | 156 | 160 |
| Consumption index | 1.56 | 1.67 | 1.62 | 1.60 | 1.62 | 1.61 |
| 2 weeks to 4 weeks: | | | | | | |
| Gain in weight (in g.) | 321 | 271 | 294 | 357 | 301 | 330 |
| Consumption index | 1.98 | 2.2 | 2.09 | 1.85 | 2.03 | 1.93 |
| 1 day to 4 weeks: | | | | | | |
| Gain in weight (in g.) | 472 | 415 | 442 | 522 | 457 | 490 |
| Consumption index | 1.84 | 2.02 | 1.93 | 1.77 | 1.89 | 1.83 |
| Gain in weight (in percent relative to the control) | 100 | 100 | 100 | 110.4 | 110 | 110 |
| Consumption index (in percent relative to the control) | 100 | 100 | 100 | 96.1 | 93.5 | 94.8 |

EXAMPLE 3

The procedure of Example 2 is followed, but using a basic foodstuff having the following composition:

|  | Percent |
|---|---|
| Wheat flour | 15 |
| Maize flour | 45 |
| Fatty materials | 0.8 |
| Soya bean flour | 25 |
| Fish meal | 7 |
| Dried milk powder | 1.2 |
| Distillers' solubles | 2 |
| Mineral and vitamin complex | 4 |

This foodstuff contains 21% of digestible proteins.

The vitamin contents, calculated per 100 kg., are as follows:

| Vitamin A | IU | 1,400,000 |
|---|---|---|
| Vitamin $D_3$ | IU | 401,500 |
| Vitamin $B_1$ | mg | 600 |
| Vitamin $B_2$ | mg | 750 |
| Vitamin $B_3$ | mg | 1,600 |
| Vitamin $B_6$ | mg | 200 |
| Vitamin $B_{12}$ | mg | 3.1 |
| Vitamin C | mg | 1,000 |
| Vitamin E | mg | 2,700 |
| Vitamin $K_3$ | mg | 125 |
| Vitamin PP | mg | 6,200 |
| Folic acid | mg | 85 |
| Biotin | mg | 10 |
| Choline | mg | 176,500 |

The chickens are divided into 2 groups. Group I receives the control feedstuff. Group II receives the control feedstuff to which the antibiotic 21,190 RP has been added at a concentration of 10 g. per metric ton of feedstuff.

The results obtained are as follows:

I.—Average weight (in grams)

|  | On day 1 | | | at 2 weeks | | | at 4 weeks | | |
|---|---|---|---|---|---|---|---|---|---|
|  | Young cocks | Young hens | Young cocks and young hens | Young cocks | Young hens | Young cocks and young hens | Young cocks | Young hens | Young cocks and young hens |
| Group I | 36 | 35 | 36 | 206 | 194 | 200 | 639 | 582 | 610 |
| Group II | 36 | 35 | 35 | 212 | 203 | 207 | 662 | 620 | 641 |

II.—Gain in weight and consumption index

|  | Group I (control) | | | Group II | | |
|---|---|---|---|---|---|---|
|  | Young cocks | Young hens | Young cocks and young hens | Young cocks | Young hens | Young cocks and young hens |
| 1 day to 2 weeks: | | | | | | |
| Gain in weight (in g.) | 170 | 159 | 164 | 176 | 168 | 172 |
| Consumption index | 1.35 | 1.35 | 1.35 | 1.35 | 1.32 | 1.33 |
| 2 weeks to 4 weeks: | | | | | | |
| Gain in weight (in g.) | 433 | 388 | 410 | 450 | 417 | 434 |
| Consumption index | 1.92 | 1.93 | 1.93 | 1.83 | 1.90 | 1.86 |
| 1 day to 4 weeks: | | | | | | |
| Gain in weight (in g.) | 603 | 547 | 574 | 626 | 585 | 606 |
| Consumption index | 1.76 | 1.76 | 1.76 | 1.69 | 1.73 | 1.71 |
| Gain in weight (in percent relative to the control) | 100 | 100 | 100 | 100.8 | 106.9 | 105.6 |
| Consumption index (in percent relative to the control) | 100 | 100 | 100 | 96 | 98.3 | 97.1 |

We claim:
1. The antibiotic herein designated 21,190 RP, which possesses the following characteristics: It is a white crystalline powder, melting at 226–228° C., soluble in water at pH 9 and in dimethylformamide, sparingly soluble in methanol and ethanol, and practically insoluble in hexane and benzene; it contains carbon, hydrogen, oxygen and chlorine and has the elementary composition: C=50.5%, H=6.6%, O=38.4%, Cl=4.5%; its ultraviolet spectrum in aqueous 0.1 N sodium hydroxide solution shows an absorption maximum at 292 nm.

$$(E_{1cm.}^{1\%}=59)$$

and an absorption minimum at 257 nm.

$$(E_{1cm.}^{1\%}=33);$$

its infrared spectrum (determined with a mixture with potassium bromide) shows principal absorption bands as follows: 3,440 strong, 2,970 medium, 2,930 strong, 2,900 shoulder, 2,840 shoulder, 1,735 strong, 1,715 medium, 1,630 medium, 1,570 strong, 1,450 strong, 1,403 medium, 1,380 strong, 1,350 medium, 1,335 shoulder, 1,305 shoulder, 1,248 strong, 1,220 weak, 1,192 medium, 1,165 medium, 1,122 strong, 1,090 strong, 1,060 strong, 1,035 very strong, 975 medium, 942 medium, 920 shoulder, 900 weak, 865 medium, 848 weak, 828 weak, 815 weak, 775 medium, 730 medium, 690 weak, 678 very weak, 655 weak, 630 shoulder, 612 weak, 570 weak, 548 weak, 525 very weak, 510 very weak; and it optical rotation is $[\alpha]_D^{20}=+3°\pm3°$ (c.=0.5, 0.1 N NaOH), $[\alpha]_{436}^{20}=+7°\pm3°$ (c.=0.5, 0.1 N NaOH), $[\alpha]_{365}^{20}=+20°\pm3°$ (c.=0.5, 0.1 N NaOH).

2. Process for the production of the antibiotic 21,190 RP defined in Claim 1, which comprises culturing *Streptomyces hygroscopicus*, DS 23,230 (NRRL 3576) under submerged aerobic conditions, commencing at a pH between 6.0 and 7.8, and at a temperature between 23° and 33° C. using an aqueous nutrient medium containing assimilable sources of carbon, nitrogen and inorganic substances until substantial antibacterial activity has been imparted to the said medium, and isolating from the medium 21,190 RP formed during the culture.

3. Process according to Claim 2 in which the pH of the culture medium at the beginning of the culture is between 6.5 and 7.5.

4. Process according to Claim 2 in which the temperature of the culture medium is 25° to 30° C.

5. Process according to Claim 2 in which the culture medium is aerated at a rate of 0.3 to 3 litres of air per litre of medium per minute.

6. Process according to Claim 2 in which 21,190 RP is separated from the culture medium by extraction with a water-immiscible organic solvent for the said antibiotic selected from the class consisting of butanol, methylene chloride, ethyl acetate and methyl isobutyl ketone.

7. Process according to Claim 6 in which 21,190 RP is isolated from its solution in the said water-immiscible organic solvent by concentrating the solution under reduced pressure and precipitating the antibiotic from the concentrate either by addition of hexane, or by cooling the solution.

8. Process according to Claim 6 in which the extraction of the antibiotic from the culture medium is effected with the medium at a pH between 3 and 9.

9. Process according to Claim 8 in which extraction of the antibiotic from the culture medium is effected with the medium at about pH 7.

References Cited

Miller: The Pfizer Handbook of Microbial Metabolites, McGraw-Hill Book Co., Inc. New York, N.Y., 1961, pp. 35, 40, 125, 126, 128 and 580.

JEROME D. GOLDBERG, Primary Examiner

U.S. Cl. X.R.

195—80